United States Patent [19]

O'Daniel

[11] Patent Number: 5,226,699
[45] Date of Patent: Jul. 13, 1993

[54] RECYCLING VEHICLE AND METHOD WITH ROTATABLE BODY

[76] Inventor: Harold W. O'Daniel, 1410 Fairhaven, Mansfield, Tex. 76063

[21] Appl. No.: 792,372

[22] Filed: Nov. 15, 1991

[51] Int. Cl.⁵ .............................................. B60P 1/30
[52] U.S. Cl. ...................... 298/8 R; 298/9; 414/468; 414/786
[58] Field of Search .................. 298/7, 10, 8 R, 8 T, 298/9; 414/468, 786

[56] References Cited

U.S. PATENT DOCUMENTS

| | | | |
|---|---|---|---|
| 1,214,976 | 2/1917 | Vail | 298/10 |
| 1,584,338 | 5/1926 | Welcker | 298/10 |
| 2,797,833 | 7/1957 | Cash | 298/11 |
| 2,914,205 | 11/1959 | Trubinski | . |
| 3,111,346 | 5/1963 | Harbers et al. | 298/8 R |
| 3,258,270 | 6/1966 | Ferris | 298/17.5 |
| 4,113,125 | 9/1978 | Schiller | . |
| 4,114,776 | 9/1978 | Pluss | 220/909 |
| 4,840,531 | 6/1989 | Dinneen | 414/470 |
| 4,915,570 | 4/1990 | Rath | 414/487 |

FOREIGN PATENT DOCUMENTS

| | | | |
|---|---|---|---|
| 516265 | 1/1931 | Fed. Rep. of Germany | 414/468 |
| 1038058 | 6/1950 | France | 414/468 |

*Primary Examiner*—David A. Bucci
*Assistant Examiner*—Gregory A. Morse
*Attorney, Agent, or Firm*—Charles D. Gunter, Jr.

[57] ABSTRACT

The refuse collecting vehicle of the invention is used for collecting and transporting separate and distinct waste materials. The vehicle includes a vehicle chassis and a storage body rotatably mounted on the chassis. The storage body is rotated to deposit separated waste materials into associated distinct storage chambers located within the storage body. The storage chambers can be sequentially dumped by tilting the storage body at an angle with respect to the vehicle chassis.

8 Claims, 5 Drawing Sheets

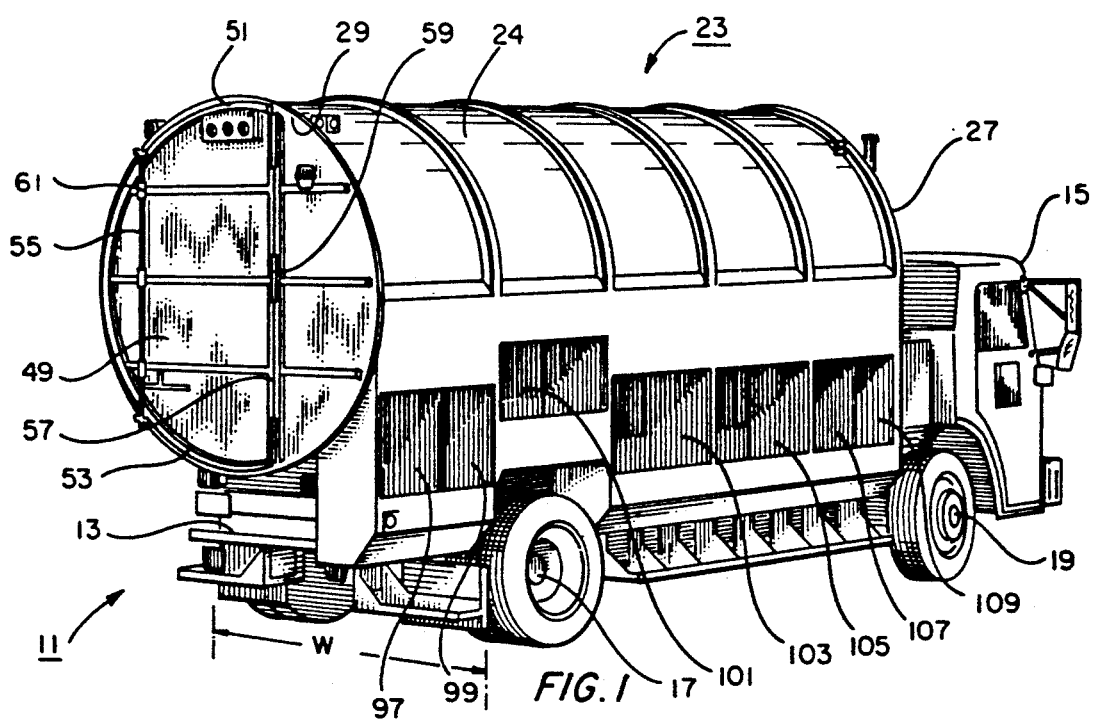
FIG. 1
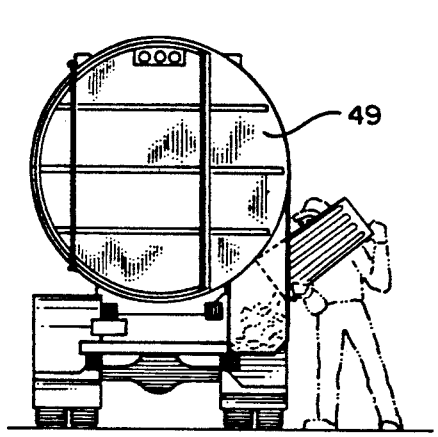
FIG. 2a
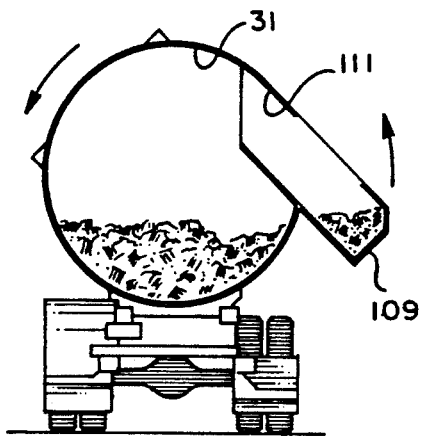
FIG. 2b
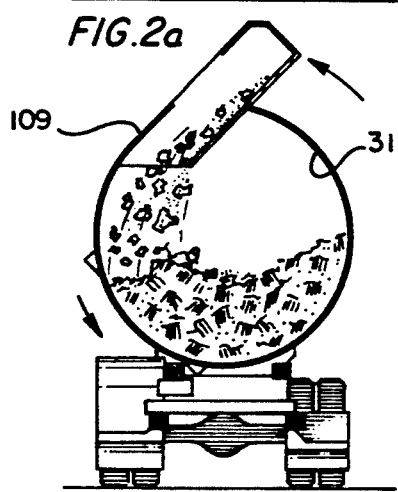
FIG. 2c
FIG. 2d

RECYCLING VEHICLE AND METHOD WITH ROTATABLE BODY

BACKGROUND OF THE INVENTION

1. Field of the Invention

The present invention relates generally to a refuse collecting vehicle for collecting and transporting separated waste materials, the vehicle being specifically adapted for separating and transporting recyclable materials such as glass, paper and plastic of the type present in domestic refuse.

2. Description of the Prior Art

The recovery of recyclable materials such as paper, plastic and glass from domestic refuse is of increasing concern at the present time. The public is increasingly concerned with the necessity of conserving natural resources and energy. This concern is heightened by the problem of solid waste disposal which has been brought to the public attention in a number of dramatic fashions in recent years.

Although many home owners are concerned with the problem of solid waste disposal and with the depletion of natural resources there is, at the present time, no convenient and economically feasible solution to the problem at hand. Recyclable materials such as papers, plastic and glass are only economically reusable if separated from domestic refuse by suitable sorting and collection techniques. Best results have been achieved in residential areas with a predominant number of single or two-family buildings, i.e., detached and semi-detached house buildings. This type of collection is burdened, however, by high cost, since relatively few buildings are accessed within a given collection distance. Although many neighborhood associations have attempted to provide recycling services, these efforts have often required volunteer effort to collect and transport the separated waste materials in private vehicles. The availability of a specially adapted collection vehicle would undoubtedly increase private sector participation in recycling efforts.

One proposed solution to the problem has been a specially constructed trailer having separate waste compartments which open from the side, the trailer being towed behind a conventional refuse collection vehicle. However, the separate trailer compartments were capable of only holding a limited volume of recyclable materials, making such an arrangement impractical for most applications.

U.S. Pat. No. 2,914,205 and U.S. Pat. No. 4,113,125 both show compartmented refuse collecting vehicles in which the vehicle body has separate collecting chambers for receiving separated recyclable materials. These designs featured complicated tailgate sections which required the use of removeable partitions or other awkward and expensive baffle arrangements for directing the separated recyclable materials into the intended compartments within the vehicle body.

The present invention has as its object to provide a vehicle and method for collecting domestic refuse, allowing separation of the waste materials into separate and distinct recyclable categories and for transporting such recyclable materials to a remote collection point without greatly increasing the labor cost, working time, or expense of the collection operation.

Another object of the invention is to provide a refuse collecting vehicle having a storage body with a plurality of internal storage chambers for receiving separated refuse materials from individual material receiving bins provided on the exterior of the storage body.

Another object of the invention is to provide an improved method for transferring materials collected in such material receiving bins to the distinct storage chambers located within the storage body.

Another object of the invention is to provide an improved method for sequentially dumping the distinct storage chambers in the storage body to thereby selectively discharge material from each of the distinct storage chambers at one or more collection locations located externally of the storage body.

Another object of the invention is to provide such a vehicle of simplified design over currently available designs and yet offer greater capacity than is currently available.

SUMMARY OF THE INVENTION

The refuse collecting vehicle of the invention is used for collecting and transporting separated waste materials. The vehicle includes a vehicle chassis having a length and a width, the length of the chassis defining a vehicle longitudinal axis. A storage body is rotatably mounted on the chassis. The storage body has a front end, a rear end and connecting tubular sidewalls which circumscribe a central longitudinal axis of the storage body and which define an interior of the body. The storage body interior is divided into a plurality of distinct storage chambers, each of the chambers being arranged generally perpendicular to the central longitudinal axis of the storage body.

Rotating means are provided for rotating the storage body about the central longitudinal axis thereof. Tilt means are provided for tilting the storage body between a collection/transport position in which the central longitudinal axis of the storage body is parallel to the vehicle longitudinal axis and a dump position in which the central longitudinal axis is at an angle to the vehicle longitudinal axis.

Preferably, the front end of the storage body is closed by an end wall and the rear end of the storage body is provided with a swinging door, whereby the contents of the body can be dumped when the storage body is tilted to the dump position. The storage body is preferably divided into a plurality of distinct storage chambers by means of a plurality of hinged doors located within the interior of the storage body, the hinged doors being arranged generally perpendicular to storage body central longitudinal axis in a closed position and being pivotable to an open position for dumping.

Additional objects, features and advantages will be apparent in the written description which follows.

BRIEF DESCRIPTION OF THE DRAWINGS

FIG. 1 is a perspective view of the refuse collecting vehicle of the invention;

FIG. 2a is an end view of the vehicle of FIG. 1 showing material being deposited into one of the distinct collection bins provided on the exterior of the storage body;

FIG. 2b is a partially sectioned end view similar to FIG. 2a showing the rotation of the storage body during the initial stages of the transfer operation which transfers collected material to the internal storage chambers;

FIG. 2c is a view similar to FIG. 2b showing the continued rotation of the storage body to deposit material into one of the storage chambers in the interior of the storage body;

FIG. 2d shows the rotation of the storage body back to the tilt-ready position;

in FIG. 9.

DETAILED DESCRIPTION OF THE INVENTION

Figure 4:
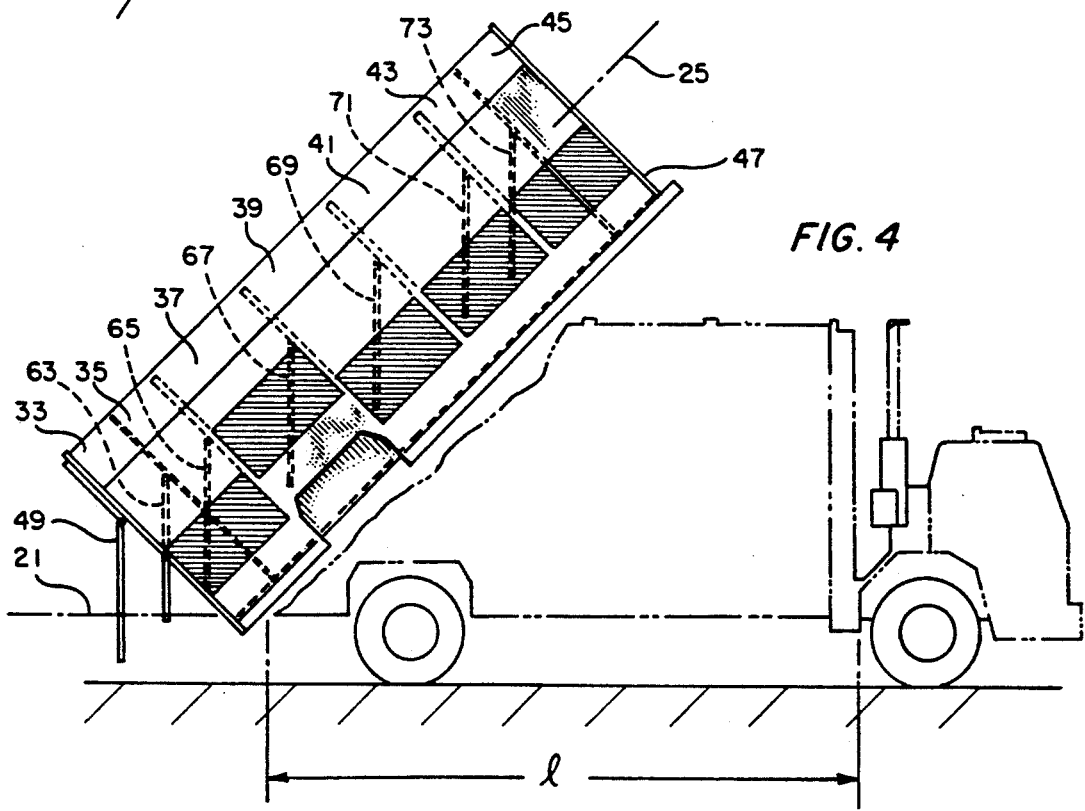
FIG. 4 is a simplified, partially sectioned side view of the vehicle in the dump position showing the hinged doors of the internal storage compartments in the open, dumping position.

FIG. 1 shows a refuse collecting vehicle of the invention designated generally as 11. The refuse collecting vehicle 11 is especially adapted for collecting and transporting separated, recyclable materials such as paper, plastic and glass. The refuse collecting vehicle 11 includes a truck chassis 13, a driving cab 15 and wheel axles 17, 19. As seen in FIGS. 1 and 4, the vehicle chassis 13 has a length "l" and a width "w." The length of the chassis 13 defines a vehicle longitudinal axis 21 for the vehicle.

The vehicle 11 also includes a storage body 23 which is rotatably mounted on the chassis 13. The storage body 23 has a front end 27, a rear end 29 and connecting tubular sidewalls 24 which circumscribe a central longitudinal axis 25 (FIG. 4) of the storage body and which define an interior 31 of the body. The storage body interior 31 (FIG. 2b) is divided into a plurality of distinct, internal storage chambers. In the embodiment shown in FIG. 4, there are seven distinct storage chambers numbered 33, 35, 37, 39, 41, 43, 45.

Figure 3:
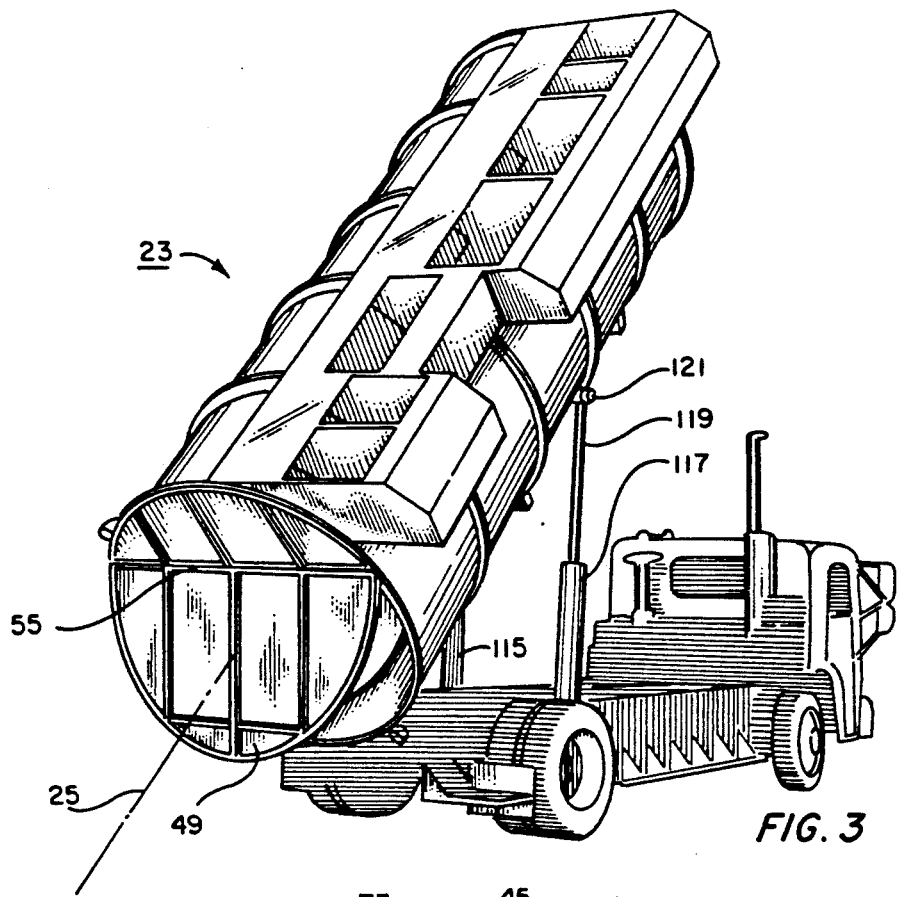
FIG. 3 is a perspective view of the vehicle of the invention in the dump position.

As shown in FIGS. 3 and 4, the front end 27 of the storage body is enclosed by means of an end wall 47. The rear end of the storage body is provided with a swinging door 49, whereby the contents of the storage body can be dumped when the storage body is tilted to the dump position shown in FIG. 3. The rear swinging door 49 (FIG. 1) has a top 51, a bottom 53 and opposing sides 55, 57. A selected side 57 of the door is pivotally mounted to the rear of the storage body by means of a hinge 59. A latch 61 is provided on the opposing side 55 for securing the swinging door in the closed position shown in FIG. 1.

Figure 11:
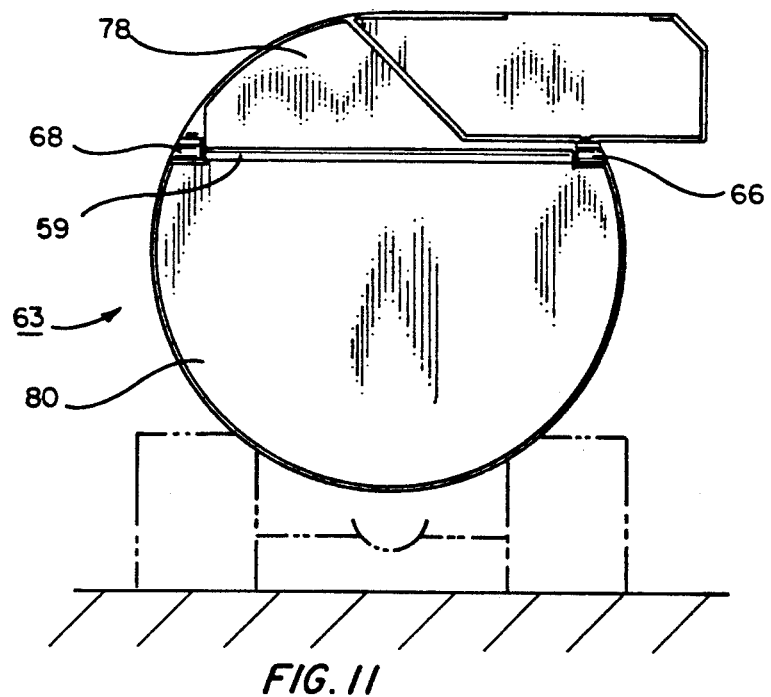
FIG. 11 is an isolated view of one of the adjustable, hinged doors with the vehicle storage body in the dump position, taken along lines XI.—XI.

Returning to FIG. 4, each of the distinct, internal storage chambers 33, 35, 37, 39, 41, 43, 45 is similarly provided with a hinged door located within the interior of the storage body 23. The hinged doors 63, 65, 67, 69, 71, 73 are arranged generally perpendicular to the central longitudinal axis 25 of the storage body 23 in the closed position but are pivotable to the open position indicated in dotted lines in FIG. 4 for dumping. As shown in FIG. 11, each door 63 includes an upper divider panel 78 which is stationarily mounted with respect to hinge 59 and a lower divider panel 80 which pivots on hinge 59 to form a door opening.

Figure 9:
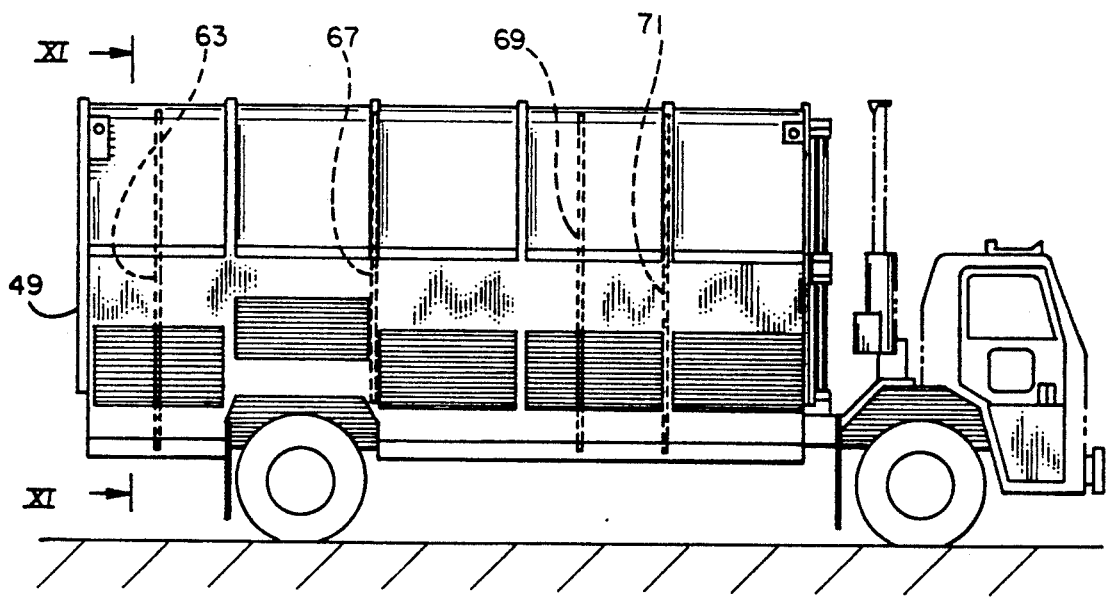
FIG. 9 is a side view of the vehicle in the transport position showing the adjustable doors of the internal storage compartments in the closed position.
Figure 10:
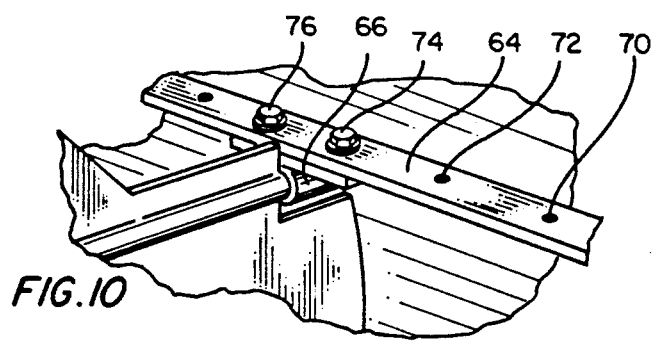
FIG. 10 is an enlarged, isolated view of the track used to support the adjustable, hinged doors within the interior of the storage body.

As shown in FIGS. 9–11, the hinged doors are preferably mounted on a pair of adjustment rails (64 shown in FIG. 10). The rails 64 are fixedly mounted on each of the outer extents 66, 68 of the door hinge 59 and run the length of the storage body interior 31. By providing series of spaced, tapped holes 70, 72, engageable by the door bolts 74, 76, the position of each door can ;be varied within the storage body interior. This allows the user of the vehicle to change the dimensions of each of the internal storage chambers 33, 35, 37, 39, 41, 43, 45. For instance, in FIG. 9, door 65 has been removed and door 69 has been moved in the direction of door 71.

Figure 7:
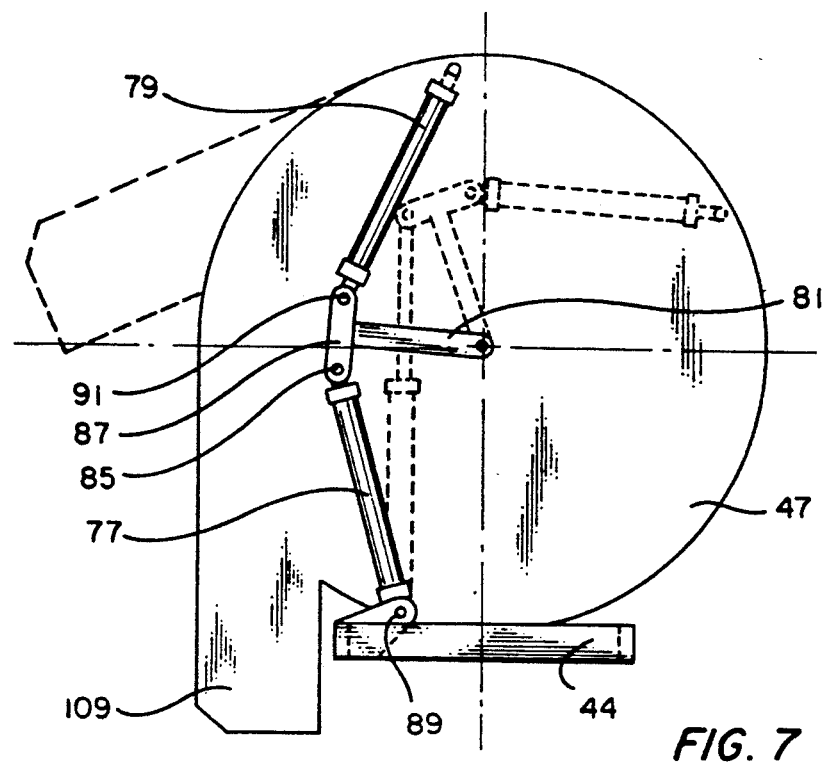
FIG. 7 is a simplified schematic of the operation of the hydraulic cylinders used to rotate the storage body and illustrating the two initial operational positions of the storage body.
Figure 8:
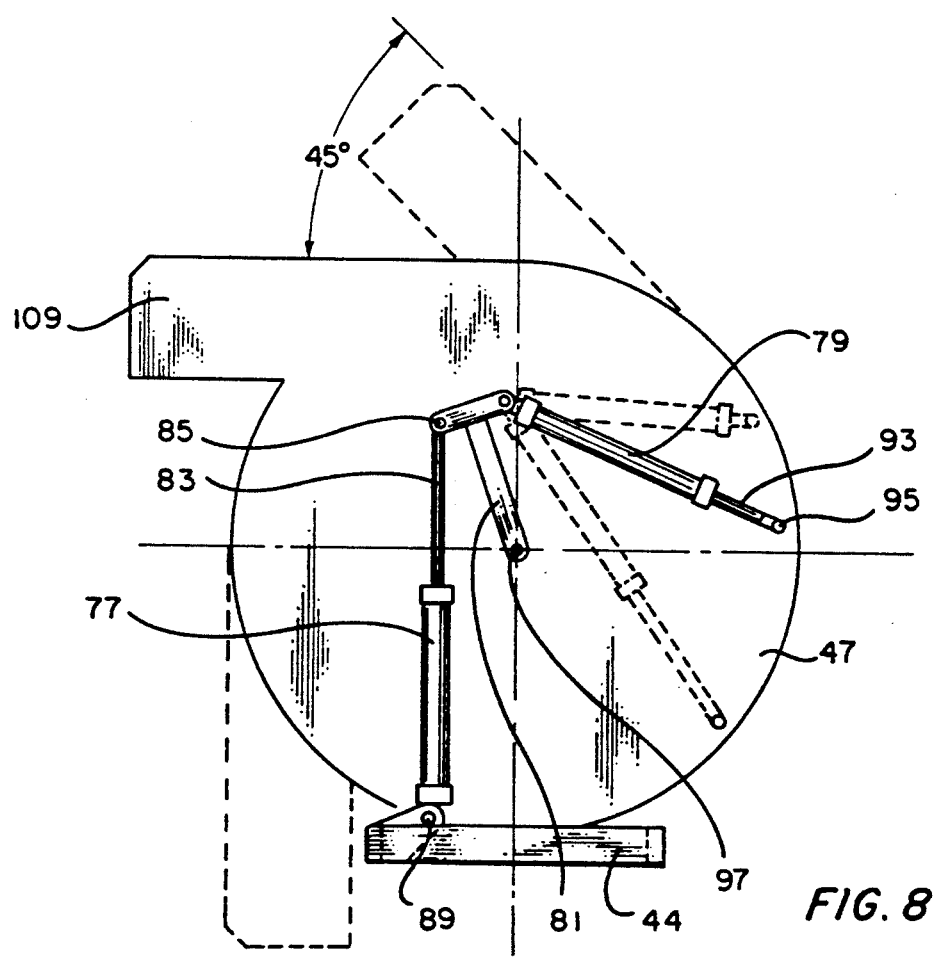
FIG. 8 is a view similar to FIG. 7 showing the next successive operational positions of the storage body.

Rotating means are provided for rotating the storage body 23 about the central longitudinal axis 25 thereof. As shown in FIGS. 7 and 8, the rotating means can comprise a plurality of hydraulic cylinders, in this case cylinders 77 and 79 which are mounted on the front end wall 47 and which are connected by means of a T-shaped link 81. Cylinder 77 has an output shaft 83 which is connected at a pivot point 85 to the left horizontal extent 87 of the T-shaped link, the base of the cylinder 77 being attached at a pivot point 89 located on cross bar 44 of the base 75. The opposite hydraulic cylinder 79 has its base secured at a pivot point 91 located on the right extent of the T-shaped link. The cylinder 79 has an output shaft 93 which is connected to the front end wall 47 of the storage body at a circumferential location 95 (FIG. 8). The T-shaped link 81 is also free to pivot about a point 97 which is located on the central longitudinal axis 25 of the storage body 23.

Figure 5:
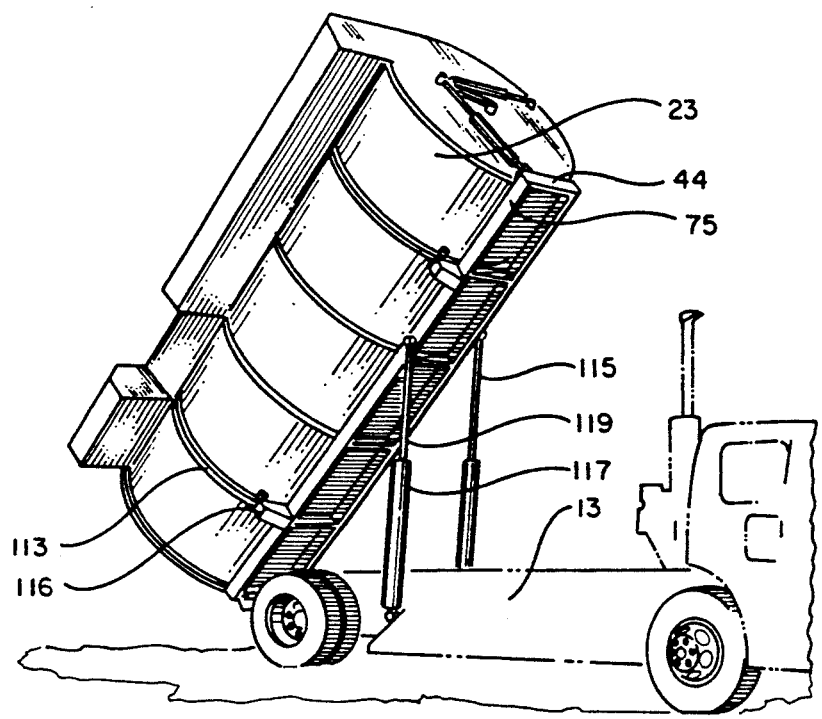
FIG. 5 is a perspective view of the vehicle in the dump position showing the base upon which the rotatable storage body is mounted.
Figure 6:
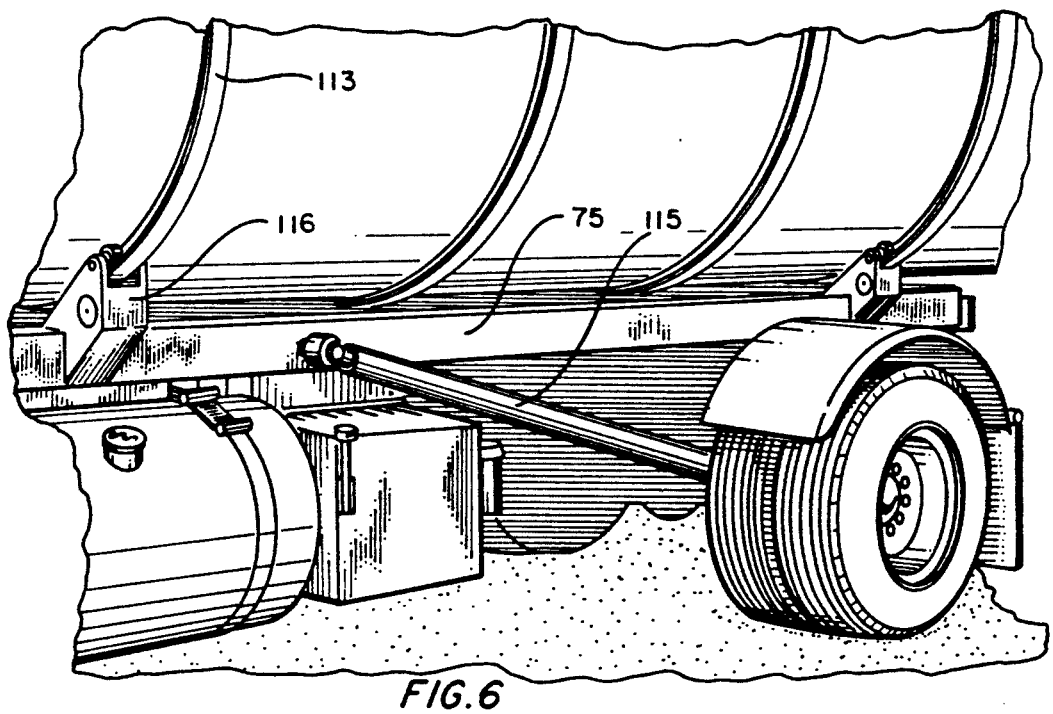
FIG. 6 is a partial, side view of the vehicle of FIG. 1 showing the arcuate ribs and mating tracks which are used to rotate the storage body with respect to the vehicle chassis.

As shown in FIGS. 5 and 6, the exterior of the storage body is provided with a plurality of arcuate ribs 113 arranged generally perpendicular to the central longitudinal axis 25 of the storage body 23. The base 75 is provided with mating tracks 116 which engage the arcuate ribs, whereby actuation of the rotating means causes the storage body to rotate within the tracks 116.

As shown in FIG. 1, the storage body 23 is also provided with a plurality of refuse receiving bins 97, 99, 101, 103, 105, 107, 109, each bin having a refuse receiving opening for receiving separated waste material and having an associated chute, e.g., chute 111 in FIG. 2b, which communicates with an associated distinct storage chamber 33 located within the interior 31 of the storage body 23.

As illustrated schematically in FIGS. 7 and 8, the refuse collecting bins (e.g. bin 109 in FIG. 7) are arranged generally perpendicular to the vehicle longitudinal axis (21 in FIG. 4) in the collection/transport position shown. The output shafts 83, 93 of both hydraulic cylinders 77, 79 are retracted. Extension of the output shaft 83 causes the bin 109 to rotate to the position illustrated in dotted lines in FIG. 7 and shown in perspective fashion in FIG. 2b. The position of the respective hydraulic cylinders 77, 79 is illustrated in dotted lines in FIG. 7. Continued extension of the output shaft 83 of the hydraulic cylinder 77 causes the bin 109 to rotate past the position shown in solid lines in FIG. 8 to the discharge position, illustrated by dotted lines in FIG. 8 and illustrated in perspective fashion in FIG. 2c. This action causes the contents of the refuse receiving bins to be deposited within the separate and distinct storage chambers located within the interior 31 of the storage body 23. Each of the refuse receiving bins can also be provided with removable partitions (not shown) in order to vary the size of each bin when the hinged door position is varied within the storage body interior 31.

After discharging the separated waste materials into the respective storage chambers, the output shaft 93 of cylinder 79 is retracted to the position shown in solid lines in FIG. 8, leaving the bin 109 oriented approximately normal to the plane defined by the storage bin in the collection/transport position shown in FIG. 7. This position of the bin 109 is also illustrated schematically in FIG. 2d and constitutes a "tilt-ready" position.

It will be appreciated with respect to FIGS. 1 and 3 that rotation of the storage body by the rotating means between the collection/transport position shown in FIG. 1 and the dump position shown in FIG. 3 rotates the door hinges 59 approximately 90° about the central longitudinal axis 25 of the storage body 23.

Preferably, the storage body 23 includes a base 75 (FIG. 5) which is tiltable with the storage body 23 as the body moves from the collection/transport position shown in FIG. 1 to the dump position shown in FIGS. 3-5. Tilt means are provided for tilting the storage body 23 between the position shown in FIG. 1 in which the central longitudinal axis 25 of the storage body 23 is parallel to the vehicle longitudinal axis 21 and the dump position (see FIG. 3) in which the central longitudinal axis 25 is at an angle to the vehicle longitudinal axis 21. Preferably, the tilt means comprises a pair of hydraulic cylinders 115, 117 (FIG. 5), each of which is pivotally connected to the vehicle chassis at one end and which has an output shaft 119 pivotally connected to the storage body base 75 at an opposite extent 121.

The operation of the refuse collecting vehicle of the invention can be explained with reference to FIGS. 2a-2d. FIG. 2a shows the normal collection/transport position of the vehicle 11 with an operator depositing a separate and distinct waste material within bin 109, the bin being arranged generally perpendicular to the vehicle longitudinal axis 21. Different types of waste materials can be deposited within each of the refuse collecting bins, thereby allowing for the transportation of separated, recyclable materials such as paper, plastic and glass. When it is desired to deposit the collected materials within the internal storage chambers of the vehicle, the rotating means are actuated causing the storage body to rotate 45° to the position shown in FIG. 2b. At this point, refuse collected within the bin 109 has not yet passed through the chute 111 to the interior 31 of the distinct storage chamber. Continued rotation causes the storage body to rotate to the position shown in FIG. 2c in which the refuse is deposited within the interior 31 of the respective storage chamber.

The operation of the rotating means can now be reversed to return the external storage bins to the position shown in FIGS. 1 and 2a. More refuse can now be collected, or the previously deposited refuse within the internal storage chambers can be transported to a remote collection site.

In order to dump the contents of the storage body, the body is again rotated to the position shown in FIG. 2d. In this position, the hydraulic cylinders are returned to the position shown in solid lines in FIG. 8 and the bin 109 is approximately normal to the plane of the bin in the collection/transport position shown in solid lines in FIG. 7.

In order to dump the contents of the storage body, the tilt means are actuated, whereby the storage body 23 is tilted to the position shown in FIGS. 3 and 4. By opening the door latches 61, the separate and distinct storage chambers 33, 35, 37, 39, 41, 43, 45 can be sequentially dumped, allowing the separated waste materials to be deposited at different collection locations. In other words, the first chamber 33 is dumped with the storage body in the position shown in FIG. 3. The body is then lowered to the tilt-ready position shown in FIG. 2d and the next internal door latch is opened. The tilt means is then again actuated, causing the body to move to the dump position shown in FIG. 3. The process is repeated for each internal storage chamber, in turn.

An invention has been provided with several advantages. The refuse collecting vehicle of the invention provides a convenient means for collecting and transporting separate and distinct recyclable materials. Each type of material is segregated within a separate and distinct storage chamber in the interior of the storage body of the vehicle. A unique rotating mechanism provides a convenient and efficient means for depositing collected refuse from the external receiving bins to the respective internal storage chambers. The storage body can be sized as required to provide the necessary capacity for holding collected materials. The vehicle is simple in design and relatively inexpensive to manufacture and has few moving parts as compared to prior art designs.

While the invention has been shown in only one of its forms, it is not thus limited but is susceptible to various changes and modifications without departing from the spirit thereof.

I claim:

1. A refuse collecting vehicle for collecting and transporting separated waste materials, the vehicle comprising:

a vehicle chassis having a length and a width, the length of the chassis defining a longitudinal axis for the vehicle;

a storage body rotatably mounted on the chassis, the storage body having a central longitudinal axis parallel to the vehicle longitudinal axis, an interior, and a tubular sidewall that circumscribes the central longitudinal axis and connects a front end and a rear end, the interior being divided into a plurality of distinct storage chambers, each of the chambers being arranged generally perpendicular to the central longitudinal axis of the storage body;

a plurality of refuse receiving bins stationarily mounted on the exterior of the storage body, each bin having a refuse receiving opening for receiving separated waste material and an associated chute which defines a permanent passageway between the refuse receiving opening and its respective associated distinct storage chamber located within the interior of the storage body;

rotating means for rotating the storage body about the central longitudinal axis thereof thereby transferring the separated waste material from each bin to its associated distinct storage chamber; and tilt means for tilting the storage body between a collection/transport position in which the central longitudinal axis of the storage body is parallel to the vehicle longitudinal axis and a dump position in which the central longitudinal axis is positioned at an angle to the vehicle longitudinal axis.

2. The refuse collecting vehicle of claim 6, wherein the tilt means is at least one hydraulic cylinder mounted between the storage body and the vehicle chassis.

3. The refuse collecting vehicle of claim 2, wherein the storage body includes a base which is tiltable with the storage body as the body moves from the collection/transport position to the dump position and wherein the rotating means is at least one hydraulic cylinder operatively connected to an output shaft, a selected one of the cylinder and shaft being connected between the base and storage body for rotating the storage a body about the central longitudinal axis.

4. The refuse collecting vehicle of claim 3, wherein the exterior of the storage body is provided with a plurality of arcuate ribs arranged generally perpendicular to the central longitudinal axis of the storage body and wherein the base is provided with mating tracks which engage the arcuate ribs whereby actuation of the rotating means causes the storage body to move within the tracks.

5. A method of collecting and transporting separated, recyclable material in a specially designed refuse collection vehicle, the method comprising the steps of:

rotatably mounting a storage body on a vehicle chassis having a longitudinal axis, the storage body having a central longitudinal axis, an interior, and a tubular sidewall that circumscribes the central longitudinal axis and connects a front end and a rear end, the interior being divided into a plurality of distinct storage chambers, each of the chambers being arranged generally perpendicular to the central longitudinal axis of the storage body;

providing a plurality of refuse receiving bins stationarily mounted on the exterior of the storage body, each bin having a refuse receiving opening for receiving separated waste material and having an associated chute which defines a permanent passageway between the refuse receiving opening and its respective associated distinct storage chamber located within the interior of the storage body;

providing rotating means for rotating the storage body about the central longitudinal axis thereof;

providing tilt means for tilting the storage body between a collection/transport position in which the central longitudinal axis of the storage body is parallel to the vehicle longitudinal axis and a dump position in which the central longitudinal axis is positioned at an angle to the vehicle longitudinal axis;

collecting and depositing distinct recyclable materials within at least two of the refuse receiving bins through their refuse receiving opening;

temporarily storing deposited distinct recyclable material within the respective bins;

actuating the rotating means to rotate the storage body about the central longitudinal axis thereof; and transferring the distinct recyclable materials from the refuse receiving bins through their respective chutes to the associated distinct storage chamber located within the interior of the storage body.

6. The method of claim 5, further comprising the steps of transporting the collected recyclable materials to a remotely located collection site and actuating the tilt means at the collection site to dump the distinct recyclable material contained in a first selected storage chamber within the interior of the storage body.

7. The method of claim 6, wherein the plurality of distinct storage chambers are defined by a plurality of hinged doors located within the interior of the storage body, and wherein the storage chambers are sequentially dumped by opening the hinged doors in sequential fashion.

8. The method of claim 7 comprising the additional steps of:

returning the storage body to the collection/transport position from the tilt position;

opening each door located within the storage body, in turn, while the storage body is in the collection/transport position; and tilting the storage body to the dump position to dump the contents of the respective storage chamber.

* * * * *